United States Patent
Aoki

(10) Patent No.: US 8,315,586 B2
(45) Date of Patent: Nov. 20, 2012

(54) SIGNAL RECEIVING DEVICE AND SIGNAL RECEIVING METHOD USING SAME, AND SIGNAL SUPPLYING UNIT AND SIGNAL SUPPLYING METHOD USING SAME

(75) Inventor: Yuuichi Aoki, Tokyo (JP)

(73) Assignee: NEC Corporation, Tokyo (JP)

(*) Notice: Subject to any disclaimer, the term of this patent is extended or adjusted under 35 U.S.C. 154(b) by 78 days.

(21) Appl. No.: 13/058,663

(22) PCT Filed: Sep. 8, 2009

(86) PCT No.: PCT/JP2009/065693
§ 371 (c)(1),
(2), (4) Date: Feb. 11, 2011

(87) PCT Pub. No.: WO2010/027092
PCT Pub. Date: Mar. 11, 2010

(65) Prior Publication Data
US 2011/0148479 A1    Jun. 23, 2011

(30) Foreign Application Priority Data
Sep. 8, 2008   (JP) .................. 2008-230195

(51) Int. Cl.
H04B 1/26    (2006.01)

(52) U.S. Cl. ........ 455/323; 455/208; 455/209; 455/318; 455/319; 455/313; 375/280; 375/281

(58) Field of Classification Search .......... 455/323, 455/208, 209, 318, 319, 313; 375/280, 281
See application file for complete search history.

(56) References Cited

U.S. PATENT DOCUMENTS

| 5,974,306 A * | 10/1999 | Hornak et al. ......... 455/323 |
| 8,165,554 B2 * | 4/2012 | Gomez ................ 455/302 |
| 2004/0002323 A1 * | 1/2004 | Zheng ................. 455/324 |

FOREIGN PATENT DOCUMENTS

| JP | 6-205064 A | 7/1994 |
| JP | 8-125565 A | 5/1996 |
| JP | 11-122134 A | 4/1999 |
| JP | 2001520815 A | 10/2001 |
| JP | 2003008670 A | 1/2003 |
| JP | 2003520487 A | 7/2003 |
| JP | 2003333116 A | 11/2003 |
| JP | 2007281895 | 10/2007 |

OTHER PUBLICATIONS

International Search Report for PCT/JP2009/065693 mailed Nov. 2. 2009.

* cited by examiner

Primary Examiner — Sanh Phu

(57) ABSTRACT

A signal receiving device is provided which can prevent the imbalance occurring between in-phase and quadrature signals. A polarity of a local oscillator output signal to be outputted from a local oscillator 13 is switched by a polarity switching unit 14 in a time division way. Each of signals outputted from the polarity switching unit 14 is frequency divided by a frequency divider 16. The frequency-divided local oscillation signal is supplied to a mixer 34. Frequency conversion of a receiving signal is performed by the mixer 34 which receives the signal and local oscillation signal to demodulate received data.

32 Claims, 12 Drawing Sheets

FIG.8

(1) Local Oscillator Output Signal
(2) Polarity Control Signal
(3) Frequency Divider Input Signal
(4) Frequency Divider Output Signal 1
(5) Frequency Divider Output Signal 2
(6) Frequency Divider Output Signal 3
(7) Frequency Divider Output Signal 4
(8) Counter Output Signal 1
(9) Counter Output Signal 2
(10) Phase Judging Unit Output Signal 1
(11) Phase Judging Unit Output Signal 2

SIGNAL RECEIVING DEVICE AND SIGNAL RECEIVING METHOD USING SAME, AND SIGNAL SUPPLYING UNIT AND SIGNAL SUPPLYING METHOD USING SAME

The present application is the National Phase of PCT/JP2009/065693, filed Sep. 8, 2009, which claims priority based on Japanese patent application No. 2008-230195 filed on Sep. 8, 2008.

TECHNICAL FIELD

The present invention relates to a signal receiving device and signal receiving method using the same and a signal supplying unit and signal supplying method using the same and more particularly to the signal receiving device and signal receiving method using the same and the signal supplying unit and signal supplying method using the same which have successfully achieved an improvement in the supply of a different local oscillation signal to a frequency conversion means.

BACKGROUND TECHNOLOGY

In recent mobile communication devices (mobile phone or a like), from a viewpoint of miniaturization and integration of a signal receiving device, a direct conversion-type signal receiving device is developed and proposed. FIG. 12 is a diagram showing a configuration made up of an RF (Radio Frequency) front end having a multistage gradual declining filtering architecture disclosed in related art Patent Reference 1.

As shown in FIG. 12, an RF signal inputted from a receiving signal input terminal 1201 is amplified by an LNA (Low Noise Amplifier) 1202 and is inputted to a mixer 1203. By using a local oscillator output signal fed through a buffer 1221 from a local oscillator 1204, an RF frequency of a receiving signal is down-converted into a 1F frequency (one fifth of the RF frequency). An output signal from the mixer 1203 is inputted to mixers 1261 and 1262. The mixers 1261 and 1262 make up an I/Q mixer in which the mixers 1261 and 1262 serve as an I mixer and Q mixer respectively. In some cases, there is provided an intermediate frequency amplifier (IF amplifier) between the mixer 1203 and I/Q quadrature mixer).

A local oscillation output signal from the local oscillator 1204 is inputted to a 4 frequency divider 1205. The 4 frequency divider 1205 divides a frequency of a local oscillation output signal by 4. The frequency-divided frequency divider signal is supplied, as a second local oscillation output signal, to the mixers 1261 and 1262 through buffers 1222 and 1223. However, in the case of the RF front end disclosed in the above Patent Reference 1, the demodulation of in-phase (I) and quadrature (Q) signal using the RF signal requires not only the mixers 1261 and 1262 for the I signal and Q signal but also the buffers 1222 and 1223, filters (LPFs) 1271 and 1272, and A/D (Analog to Digital) converters 1281 and 1282 for the I and Q signals.

Moreover, a direct conversion-type signal receiving device is disclosed in related art Patent Reference 2 in which only one mixer is used for demodulation of I and Q signals using an RF signal. FIG. 13 is a diagram showing the direct conversion-type signal receiving device. In FIG. 13, a radio modulated signal received by an antenna 1301 passes through a band pass filter (BPF) 1302, a low noise amplifier (LNA) 1303, and a band pass filter 1304 sequentially and is then inputted to a mixer 1305. Here, a quadrature converting section involving the mixer 1305 is operated according to the direct conversion method and a local oscillation signal to be supplied to the mixer 1305 has the same frequency as that of a receiving signal. The local oscillation signal to be supplied to the mixer 1305 is then supplied through either of an in-phase (I) path 1371 or a quadrature (Q) path 1373. Which pass is to be used is selected according to a phase pass control signal 151 fed from a timing signal generating unit 1315.

When the phase pass control signal 151 is "H", the mixer 1305 and a local oscillator 1375 are connected to each other by a phase pass on/off switch 1374 through the in-phase pass 1371, that is, not through a −90° phase shifter 1372. On the other hand, when the phase pass control signal 151 is "L", the mixer 1305 and the local oscillator 1375 are connected to each other by the phase pass on/off switch 1374 through the quadrature pass 1373, that is, through the −90° phase shifter 1372.

An output terminal of the mixer 1305 is connected to an A/D converter 1311 through a first low pass filter (LPF) 1361 and a second low pass filter 1362 making up a filter section, a filter on/off switch 1308 making up a filter switching section, a variable gain amplifier (VGA) making up an amplifier section. The filter on/off switch 1308, when an IQ pass control signal 152 from the timing signal generating section 1315 is "H", selects the first LPF 1361 and, when the IQ pass control signal 152 is "L", selects the second LPF 1362. An output terminal of the A/D converter 1311 is connected to an in-phase pass output 131 by an IQ output pass on/off switch 1312 when the IQ pass control signal 152 is "H" and is connected, when the IQ pass control signal 152 is "L", to a quadrature pass output 132.

The direct conversion signal receiving device disclosed in the related art Patent Reference 2 has only one of each of the mixer 1305, a buffer amplifier located between the local oscillator and the mixer, A/D converter 1311, and the like and, therefore, when compared with the signal receiving device of the direct conversion type disclosed in the related art Patent Reference 1 in which two of these components are provided for the in-phase and quadrature signals, an area and power consumption can be reduced. Moreover, an influence caused by variations in functions of components prepared for the in-phase and quadrature signals.

Further, another direct conversion-type signal receiving device is also disclosed in related art Patent Reference 3. The disclosed signal receiving device is so configured to convert an output signal fed from a local oscillator into one pair of inputted signals having a quadrature phase relation with each other, in a digital phase shifter/frequency divider, and is inputted to one pair of mixers. Furthermore, the related art Patent Reference 4 discloses a frequency synthesizer. The disclosed frequency synthesizer includes a frequency divider having a phase judging unit to judge a phase of a frequency divider output signal in which a phase of the frequency divider output signal is judged by a phase judging unit and an oscillation frequency of a voltage control oscillator is controlled.

RELATED ART DOCUMENTS

Patent References

Patent Reference 1: Japanese Patent Application Laid-open No. 2003-520487
Patent Reference 2: Japanese Patent Application Laid-open No. 2003-333116
Patent Reference 3: Japanese Patent Application Laid-open No. 2001-520815

Patent Reference 4: Japanese Patent Application Laid-open No. 2007-281895

DISCLOSURE OF INVENTION

Problems to be Solved by the Invention

As described above, in the RF front end disclosed in the Patent Reference 1, not only the mixer but also the buffer, filter (LPF), and A/D converter are required, in every in-phase signal and quadrature signal, for demodulating the in-phase signal (I) and quadrature signal (Q) using an RF signal. This problem has been solved by the direct conversion-type signal receiving device disclosed in the Patent Reference 2, however, the signal receiving device has a technological problem as described below.

That is, in the direct conversion-type signal receiving device, variations occur in strength and phase of a signal that the mixer is to receive from the local oscillator 1375. The reason is that there are provided, in a separate manner, two paths being the paths 1371 and 1373 through which a frequency signal outputted from the local oscillator 1375 passes. As a result, due to a difference in path and in loss between the paths 1371 and 1373, the imbalance between the in-phase (I) signal and quadrature signal (Q) to be demodulated occurs, causing an interference with receiving signals.

Further, in the signal receiving device disclosed in the Patent Reference 3, an output signal fed from the local oscillator is converted into one pair of injected signals having a quadrature phase relation with each other, in the digital phase shifter/frequency divider, and is inputted to one pair of mixers. In this configuration, it is in the digital phase shifter/frequency divider that the output signal fed from the local oscillator is converted into one pair of injected signals having a quadrature phase relation with each other and the injected signals having the quadrature phase relation with each other is supplied to each of separated mixers through each of separated signal paths. Therefore, the mechanism disclosed in the Patent Reference 2 in which one pair of injected signals having a quadrature phase relation with each other is supplied to a single mixer through a single signal path is not disclosed at all.

Furthermore, in the frequency synthesizer disclosed in the Patent Reference 4, a phase of a frequency divider output signal is judged by the phase comparator and an oscillation frequency of a voltage control oscillator is controlled based on the result from the judgment. However, though there is a description that the output signal from the phase comparator is used to control an oscillation frequency of the voltage control oscillator, there is no description in the Patent Reference 4 that, by using the result of phase comparison in what portion of other electrical circuits, the technological problem being internally present in the electrical circuit can be solved.

In view of the above, an object of the present invention is to provide the signal receiving device and signal receiving method using the same and the signal supplying unit and signal supplying method using the same in which different local oscillation signals are supplied through a single signal supplying path.

Means for Solving the Problem

To solve the above problems, a first aspect of the present invention is characterized in that a signal receiving device includes an inputting unit to which a receiving signal is inputted, a signal outputting unit to output a first signal having a frequency being same as or different from a signal of the receiving signal, a local oscillation signal outputting unit to output a second signal, in a time division way, having a specified phase relationship with the first signal based on the first signal to be outputted from the signal outputting unit, and a converting unit to convert a frequency of the receiving signal to be inputted from the inputting unit based on a local oscillation signal to be outputted from the local oscillation signal outputting unit.

A second aspect of the present invention is characterized in that a signal receiving method for processing of converting a frequency of a receiving signal having a predetermined frequency to be received by a signal receiving device includes a step of outputting a first signal having a frequency being same or different from a frequency of the receiving signal from a signal outputting unit, a step of outputting, in a time division way, the first signal to be outputted from the signal outputting unit, a second signal having a specified phase relationship with the first signal to be outputted from the signal outputting unit, and a step of performing the processing of converting a frequency of the receiving signal based on the signal to be outputted in a time division way.

A third aspect of the present invention is characterized in that a signal supplying unit includes a first signal outputting unit to output a first signal having a frequency being same as or different from an input signal to be inputted by an inputting unit, a second signal outputting unit to output, based on the first signal to be outputted from the first signal outputting unit, the first signal and a second signal having a phase being different from a phase of the first signal in a time division way, and a supplying unit to supply the signal to be outputted from the second signal outputting unit to a processing unit to perform electrical processing of the input signal.

A fourth aspect of the present invention is characterized in that a signal supplying method for processing of an input signal having a specified frequency to be inputted from an inputting unit includes a step of outputting a first signal having a frequency being same as or different from a frequency of the input signal, a step of outputting, in a time division way, based on the first signal to be outputted from the signal outputting unit, the first signal and a second signal having a phase being different from a phase of the first signal and a step of supplying the signal to be outputted, in a time division way, to a processing unit to perform processing of the input signal.

Effects of the Invention

According to the present invention, it is made possible to supply a local oscillation signal to a frequency converting means without the difference in path. This enables the imbalance among frequency-converted signals to be resolved.

BRIEF DESCRIPTION OF DRAWINGS

FIG. 8 is a timing chart to explain one example of operations of the signal receiving device according to the second exemplary embodiment of the present invention.

EXPLANATION OF LETTERS AND NUMERALS 10, 10A, and 10B: Signal receiving device;
11, 11A, and 11B: Local oscillation signal supplying system;
12, 12A, and 12B: Phase judging system;
13, 73, and 1113: Local oscillator (signal outputting means, first signal outputting means);
14, 74, and 1114: Polarity switching unit (part of local oscillation signal outputting means, part of second signal outputting means);
16: 2 frequency divider (part of local oscillation signal outputting means, part of second signal outputting means);
17, 77, and 1117: Buffer (part of local oscillation signal outputting means, signal supplying means);
21: 2 frequency divider (part of phase judging means);
22, 82, and 1122: Phase judging unit (part of phase judging means);
23, 83, and 1123: Control circuit (part of phase judging means);
31: Antenna (part of inputting means);
32: BPF (part of inputting means);
33: LNA (part of inputting means);
34: Mixer (converting means, processing means);
35: Filter (part of digital signal processing means);
36: Variable gain amplifier (part of digital signal processing means);
37: A/D converter (part of digital signal processing means);
38: Digital signal processing unit (part of digital signal processing means);
76: 4 frequency divider (part of local oscillation signal outputting means);
81: 2 bit counter (part of phase judging means); and
1116: N frequency divider (part of local oscillation signal outputting means).

BEST MODE OF CARRYING OUT THE INVENTION

The present invention provides a configuration in which a local receiving signal or the like to be used for frequency conversion is generated in a time-division way and is then supplied to an outputting system.

First Exemplary Embodiment

Figure 1:
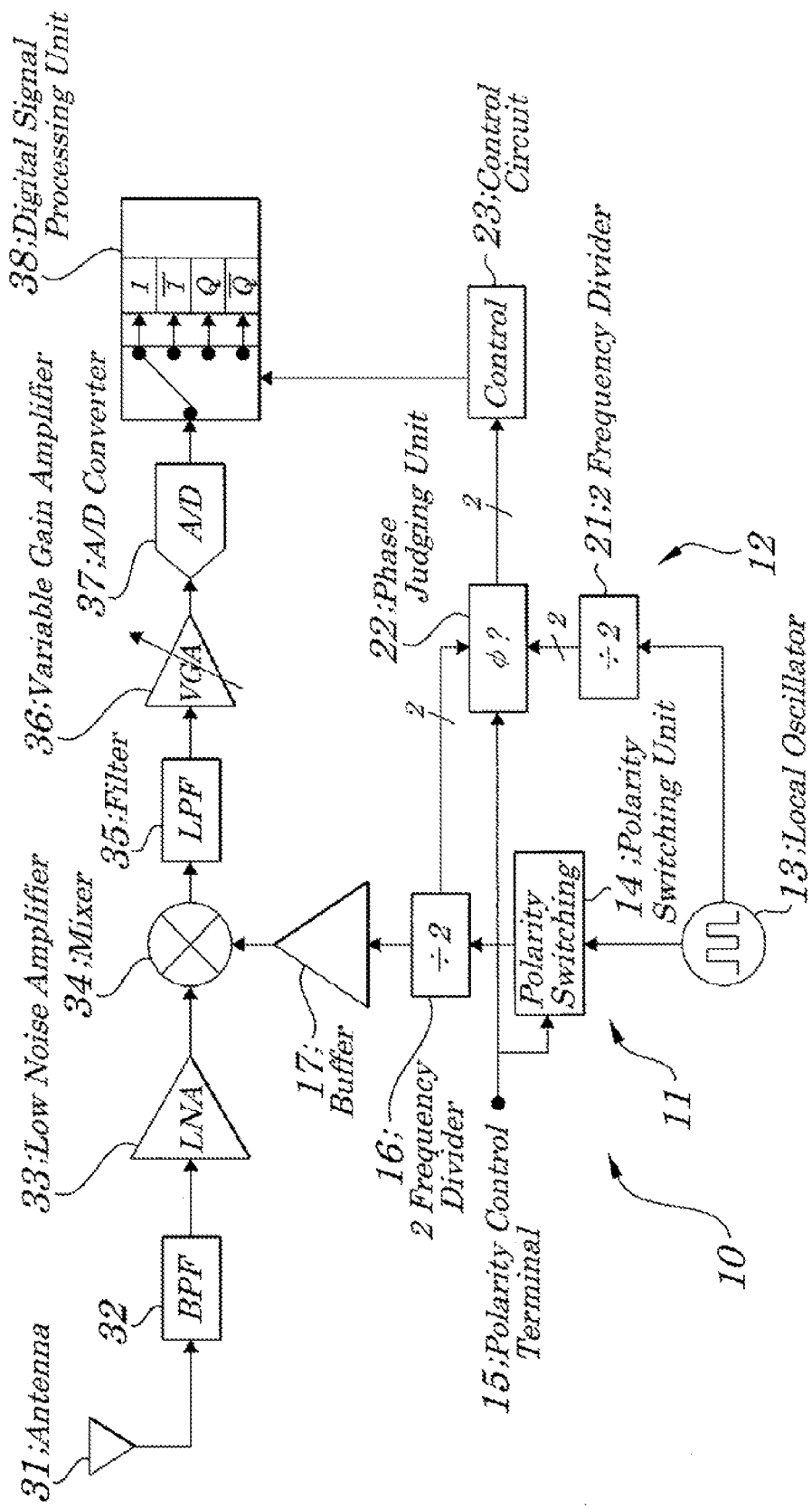
FIG. 1 is a block diagram showing electrical configurations of a signal receiving device according to a first exemplary embodiment of the present invention.
Figure 2:
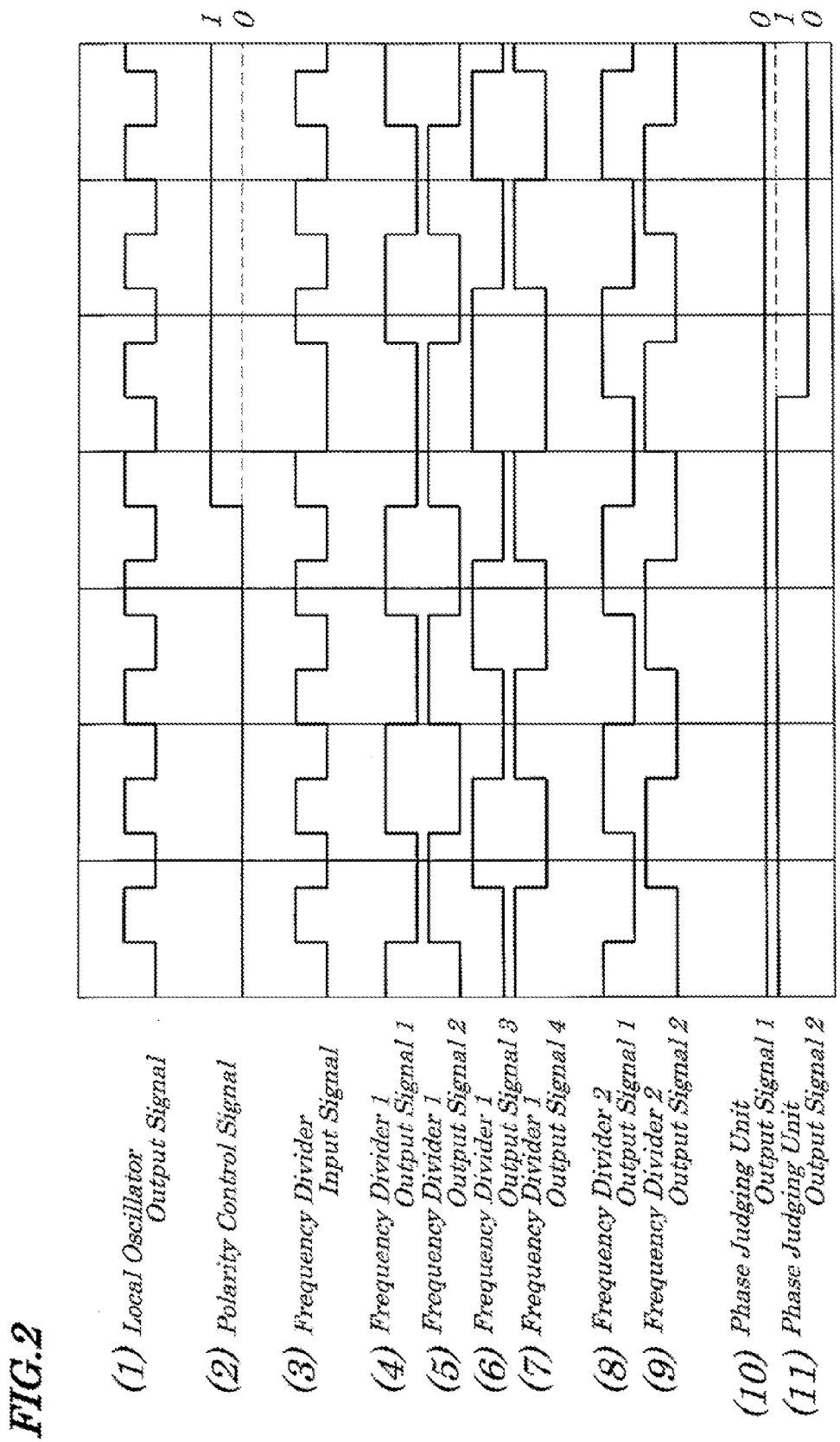
FIG. 2 is a timing chart to explain one example of operations of the signal receiving device according to the first exemplary embodiment of the present invention.
Figure 3:
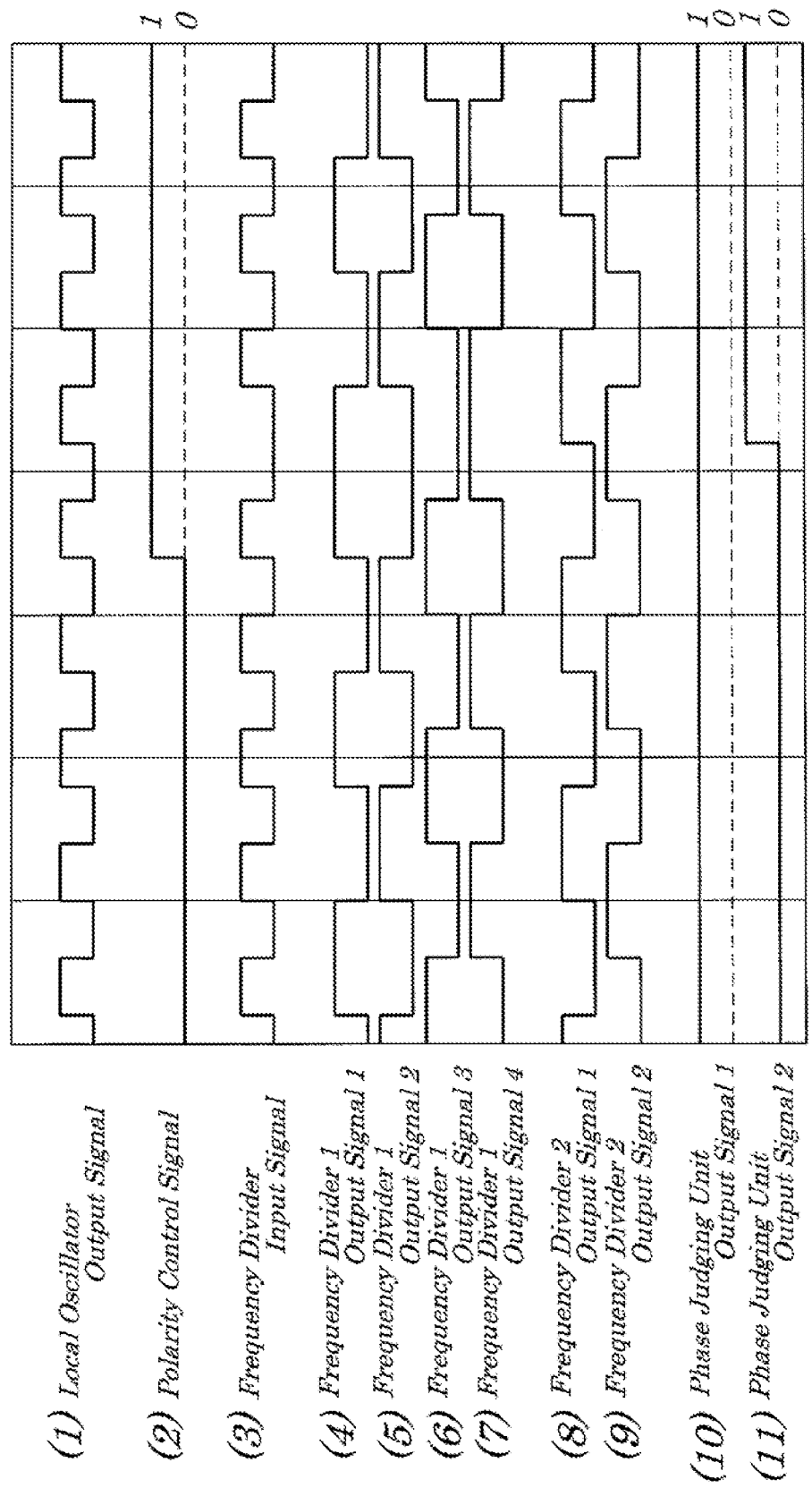
FIG. 3 is a timing chart to explain another example of the operations of the signal receiving device according to the first exemplary embodiment of the present invention.
Figure 4:
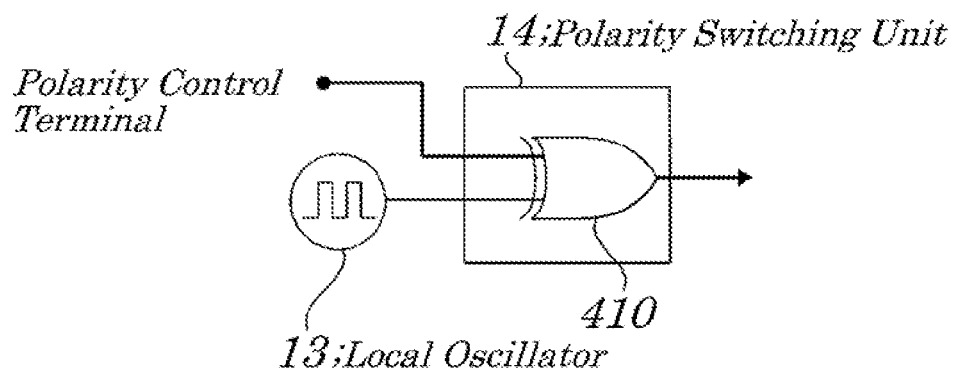
FIG. 4 is a diagram showing one example of a polarity switching unit to be used in the signal receiving device according to the first exemplary embodiment of the present invention.
Figure 5:
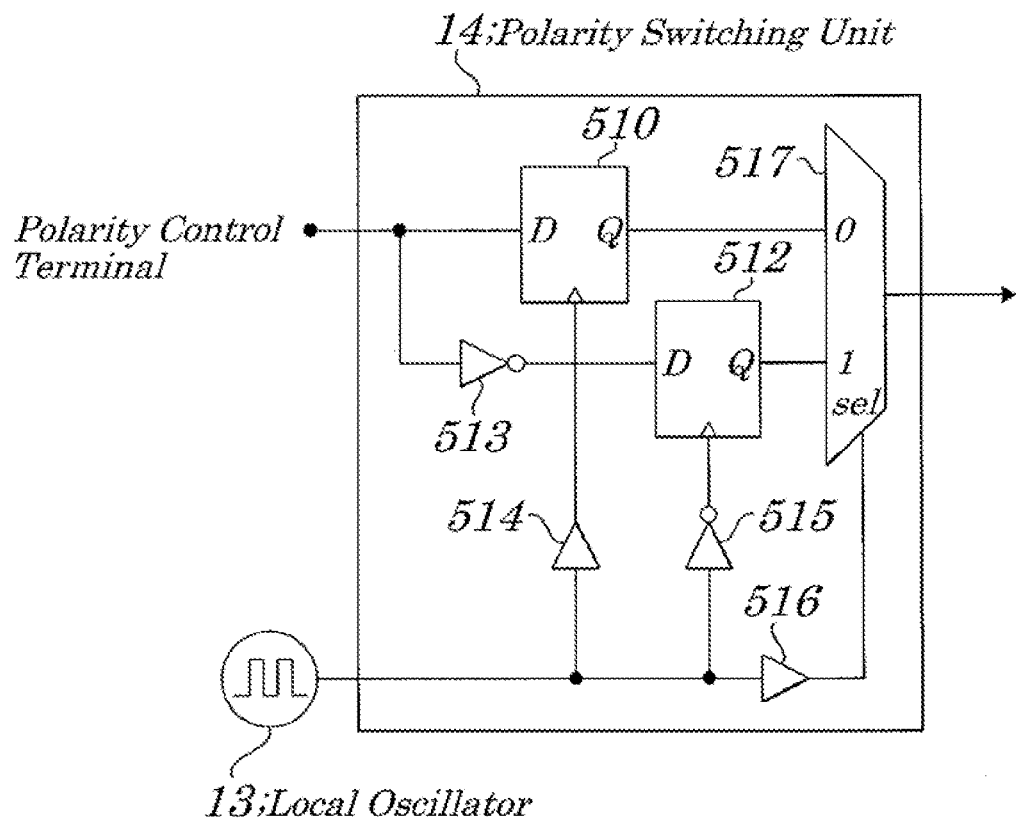
FIG. 5 is a diagram showing another example of the polarity switching unit to be used in the signal receiving device according to the first exemplary embodiment of the present invention.
Figure 6:
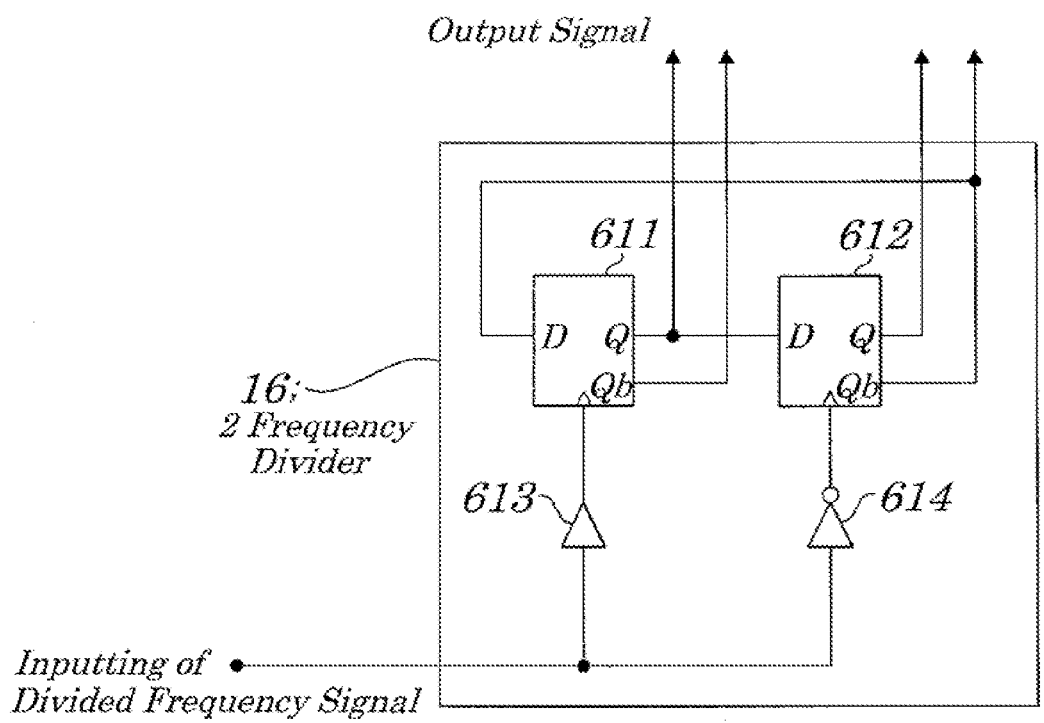
FIG. 6 is a diagram showing an example of a frequency divider of the signal receiving device according to the first exemplary embodiment of the present invention.

FIG. 1 is a block diagram showing electrical configurations of the signal receiving device according to a first exemplary embodiment of the present invention. FIG. 2 is a timing chart to explain one example of operations of the signal receiving device. FIG. 3 is a timing chart to explain another example of the operations of the signal receiving device. FIG. 4 is a diagram showing one example of a polarity switching unit to be used in the signal receiving device. FIG. 5 is a diagram showing another example of the polarity switching unit to be used in the signal receiving device. FIG. 6 is a diagram showing an example of a frequency divider of the signal receiving device.

The signal receiving device 10 according to the first exemplary embodiment of the present Invention is a unit that can prevent the imbalance occurring between in-phase and quadrature signals at time of the demodulation of quadrature modulated signals. Main elements of the invention, as shown in FIG. 1, includes a local oscillation signal supplying system 11 to supply a local oscillation signal to a local oscillation signal input terminal of a differential input mixer 34 (hereinafter, may be simply referred to as "mixer") and a phase judging system 12 making up the signal receiving device 10. The local oscillation signal supplying system 11 has a local oscillator 13, a polarity switching unit 14, a 2 frequency divider 16, and a buffer 17. The phase judging system 12 is constructed of a 2 frequency divider 21, a phase judging unit 22, and a control circuit 23.

The local oscillator 13 in the local oscillation signal supplying system 11 is an oscillator to output a local oscillator output signal ((1) in FIGS. 2 and 3) having a frequency twice that of the local oscillation signal to be supplied to the mixer 34. The polarity switching unit 14 connects its input to an output of the local oscillator 13 and allows a polarity switching input portion to receive a polarity control signal ((2) in FIGS. 2 and 3) having a specified phase relationship with the phase of the local oscillator output signal from a polarity control terminal 15 and switches the polarity of the local oscillator output signal based on the polarity control signal and outputs a frequency divider input signal ((3) in FIGS. 2 and 3). Examples of the polarity switching unit 14 are shown in FIGS. 4 and 5. The polarity switching unit 14 shown in FIG. 4 is made up of an exclusive OR (XOR) circuit 410 and the polarity switching unit 14 shown in FIG. 5 is made up of flip-flop circuits 510 and 512, inverters 513 and 515, buffers 514 and 516, and a selector 517.

The 2 frequency divider 16 is connected to an output port of the polarity switching unit 14 and outputs a first frequency divided signal (hereinafter referred to as "frequency divider 1 output signal 1", (4) in FIGS. 2 and 3), a second frequency divided signal (hereinafter, referred to as "frequency divider 1 output signal 2, (5) in FIGS. 2 and 3), a third frequency divided signal (hereinafter, referred to as "frequency divider 1 output signal 3", (6) in FIGS. 2 and 3), and additionally a fourth frequency divided signal (hereinafter, referred to as "frequency divider 1 output signal 4, (7) in FIGS. 2 and 3)" all of which are a local oscillation signal having a frequency required by the mixer 34. All the frequency divider 1 output signal 1, frequency divider 1 output signal 2, frequency divider 1 output signal 3, frequency divider 1 output signal 3, and frequency divider 1 output signal 4 are obtained by dividing the frequency of the local oscillation output signal fed from the local oscillator 13 by two. The frequency divider 1 output signal 1 and frequency divider 1 output signal 2 are in opposite phase with each other and the frequency divider 1 output signal 3 and frequency divider 1 output signal 4 are in opposite phase with each other. The frequency divider 1 output signals 1 and 3 are out of phase by ¼ their period and the frequency divider 1 output signals 2 and 4 are out of phase by ¼ their period respectively. The example of the 2 frequency divider 16 is shown in FIG. 6. The 2 frequency divider 16 is made up of flip-flop circuits 611 and 612. The buffer 17 is a circuit which makes operations of the 2 frequency divider 16 difficult to be influenced by operations of the mixer 34.

The 2 frequency divider 21 of the phase judging system 12 is a circuit to divide a frequency by two and to output a fifth frequency divided signal (hereinafter, referred to as "frequency divider 2 output signal 1", (8) in FIGS. 2 and 3) and a sixth frequency divided signal (hereinafter, referred to as "frequency divider 2 output signal 2", (9) in FIGS. 2 and 3). The frequency divider 2 output signals 1 and 2 are obtained by dividing the frequency of the local oscillator output signal fed from the local oscillator 13 by two. The frequency divider 2 output signals 1 and frequency divider 1 output signal 1 are in phase with each other. The frequency divider 2 output signals 1 and 2 are out of phase by ¼ their period.

The phase judging unit 22 is a circuit to receive a polarity control signal fed from the polarity control terminal 15, frequency divider 1 output signals 1, 3, and 4 fed from the 2 frequency divider 16, and frequency divider 2 output signals 1 and 2 fed from the 2 frequency divider 21 and then to output a phase judging unit output signals 1 and 2 (respectively (10) and (11) in FIGS. 2 and 3). The phase judging unit 22 is so configured as to hold the phase judging unit output signals 1 and 2 until a succeeding value is determined.

The mixer 34 described above receives a signal through an antenna 31, a band pass filter (BPF) 32, and a low noise amplifier (LNA) 33 and receives local oscillation signals from the above local oscillation signal supplying system 11. The output from the mixer 34 is connected to a filter 35 and the output from the filter 35 is connected to a variable gain amplifier 36 and the output from the A/D (Analog to Digital) converter 37 is connected to a digital signal processing unit 38.

Next, with reference to FIGS. 1 to 6, operations of the signal receiving device of the present embodiment will be described. The demodulation of received signals in the present embodiment is roughly explained as follows. The signal received by the antenna 31, after its band is limited by the band pass filter 32, is amplified via the low noise amplifier 33. By the mixer 34 which receives both the amplified signal and local oscillation signal supplied from the local oscillation signal supplying system 11, the received signal is down-converted, via a time-series method, to a base band signal having I (in-phase) components and a base band signal having Q (quadrature) components. At the down-conversion process, each of the base band signals takes two phase states in some cases.

The down-converted base band signal passes through the filter 35 and then undergoes gain adjustment by the variable gain amplifier 36 and is further digitized by the A/D converter 37 to be supplied to a digital signal processing unit 38. The digital signal processing unit 38, under the control of the control circuit 23, performs processing so that a correct digital value out of digital values for the two phase states is outputted as a received digital value.

The down conversion from a received signal to a base band signal in the mixer 34, as described above, is performed by the supply of a local oscillation signal from the local oscillation signal supplying system 11 to the mixer 34. The local oscillation signal is supplied by the following way. In the polarity switching unit 14 to which the local oscillator output signal ((1) in FIGS. 2 and 3) to be outputted from the local oscillator 13 is supplied, the polarity of the local oscillator output signal is switched by the polarity control signal ((2) in FIGS. 2 and 3) to be supplied from the polarity control terminal 15 and, as a result, the frequency divider input signal ((3) in FIGS. 2 and 3) whose phase is inverted by 180 degrees between before and after the switching of the polarity is inputted to the 2 frequency divider 16. FIGS. 2 and 3 show results from analysis by logic simulation between the local oscillation signal supplying system 11 and the phase judging system 12.

The 2 frequency divider 16, in response to the above frequency divider input signals, the frequency divider 1 output signal 1 and frequency divider 1 output signal 2 (respectively (4) and (5) in FIGS. 2 and 3). The frequency divider 1 output signal 1 and frequency divider 1 output signal 2 are signals to be generated in response to rises of the frequency divider input signal. The frequency divider 1 output signal 1 and frequency divider 1 output signal 2 are supplied, as local oscillation signals, to a local oscillation signal input port of the mixer 34 through the buffer 17. When the 2 frequency divider 16 shown in FIG. 6 is used, the path through which the local oscillator output signal travels is always the same. Moreover, the 2 frequency divider 16 also generates the frequency divider 1 output signal 3 and frequency divider 1 output signal 4 (respectively (6) and (7) in FIGS. 2 and 3) for phase comparison described later. The frequency divider 1 output signal 3 and frequency divider 1 output signal 4 are the signals to be generated in response to falls of the frequency divider input signals.

By supplying a local oscillation signal to the mixer 34 described as above, the problem of the imbalance between in-phase and quadrature components caused by a difference in path and in loss of the local oscillation signal can be solved. The above problem of the imbalance described above can be solved by polarity switching of the local oscillator output signal and by frequency dividing of a signal obtained after the polarity switching, however, the frequency divider 1 output signal 1 and frequency divider 1 output signal 2 to be outputted by the polarity switching are not always outputted in a specified phase state. That is, the frequency divided signal, as shown in signals (4), (5) (6), and (7) in FIGS. 2 and 3, is outputted from the frequency divider 16 in a state where, when the polarity is set at 0 degrees by the polarity switching unit 14, the transition occurs to phase state of either 0 degrees or 180 degrees, or in a state where, when the polarity is set at 180 degrees by the polarity switching unit 14, the transition occurs to phase state of either 90 degrees or −90 degrees. This is attributable to a circuit state appearing immediately before the polarity switching or to the occurrence of a glitch (small pulse-like noise occurring when a signal polarity is switched). Therefore, the control for determined transition to any one of the frequency divider 1 output signals 1 and 2 described above becomes difficult.

As described above, as the polarity switching unit 14, the circuits shown in FIGS. 4 and 5 may be employed, however, when the circuit using the exclusive OR circuit shown in FIG. 4 is used, there is a high possibility that the glitch occurs unless timing of switching signals between a polarity control signal fed from the polarity control terminal 15 and a local oscillator output signal fed from the local oscillator 13 coincides exactly with each other. Even when either of the circuits shown in FIGS. 4 and 5 is used as the polarity switching unit 14, in some cases, the signal to be outputted from the polarity switching unit 14 in response to the polarity control signal fed from the polarity control terminal 15 takes two phase states.

There is provided a means for judging to which phase state a transition took place out of transitions to phase states of 0 degrees and 180 degrees, when polarity is set at 0 degrees by the polarity switching unit 14, and also judging to which phase state a transition took place out of the phase state of 90 degrees and −90 degrees, when the polarity is set at 180 degrees by the polarity switching unit 14, that is, the phase judging system 12 is provided as the above means for judging to which phase state out of the two phase states the transition has occurred. The phase judging unit 22 in the phase judging system 12, after receiving a polarity control signal from the polarity control terminal 15, the frequency divider 1 output signals 3 and 4 from the 2 frequency divider 16, and frequency divider 2 output signals 1 and 2 ((8) and (9) in FIGS. 2 and 3) from the 2 frequency divider 21, outputs the phase judging unit output signals 1 and 2 ((10) and (11) in FIGS. 2 and 3).

The phase judging unit output signal 1, when the polarity control signal level is 0, takes the same polarity value as the frequency divider 1 output signal 1 that occurs at a rise of the frequency divider 2 output signal 2 and, when the polarity control signal level is 1, takes the same polarity value as the frequency divider 1 output signal 3 that occurs at a rise of the frequency divider 2 output signal 2. The phase judging unit output signal 2, when the polarity control signal level is 0, takes the same polarity value as the frequency divider 1 output signal 4 that occurs at a rise of the frequency divider 1 output signal 1 and, when the polarity control signal level is 1, takes the same polarity value as the frequency divider 1 output signal 1 that occurs at a rise of the frequency divider 2 output signal 1.

Now, the phase judgment process by using the frequency divider 2 output signal 1 as its reference signal is described below. In the case of the left side of FIG. 2, that is, while the polarity control signal level is 0, the frequency divider 1 output signal 1 and the frequency divider 2 output signal 1 are in phase with each other. In this state, signals inputted from the mixer 34 to the filter 35 are also in phase with each other. During the above state, the polarity value of the phase judging unit output signal 1 is 0 and the polarity value of the phase judging unit output signal 2 is 1 (this state of outputted phase judgment is referred to as a "state 01".

By applying the method of explanation used for the left side of FIG. 2 to the right side of FIG. 2, the right side of FIG. 2 is described. That is, while the polarity control signal level is at 1 and the frequency divider 1 output signal lags 90 degrees with respect to the frequency divider 2 output signal 1. The frequency divider 1 output signal is phase-reversed to that of the frequency divider 2 output signal 2. In this state, signals to be inputted from the mixer 34 to the filter 35 are in quadrature (Q) phase and opposite phase. During the above state, the polarity of the phase judging system output signal 1 is 0 and the polarity value of the phase judging system output signal is 0 (this state of outputted phase judgment is referred to as a "state 00").

By applying the method of explanation used for the left side of FIG. 2 to the left side of FIG. 3, the signal state of the left side of FIG. 3 is described. That is, while the polarity control signal level is at 0 and the frequency divider 1 output signal 1 is reversed in phase with the frequency divider 2 output signal 1. In this state, signals to be inputted from the mixer 34 to the filter 35 are in opposite phase with each other.

In the above state, the polarity of the phase judging system output signal 1 is 1 and the polarity of the phase judging system output signal 2 is 0 (this state of outputted phase judgment is referred to as a "state 10").

In a similar way to the above, the signal state of the right side of FIG. 3 is described. While the polarity control signal level is 1, the frequency divider 1 output signal 1 has a phase advance of 90 degrees relative to the frequency divider 2 output signal 1. The frequency divider 1 output signal 1 is in phase with the frequency divider 2 output signal 1. In this state, the signals to be inputted to the filter 35 from the mixer 34 are in quadrature (Q) phase and in phase with each other. In the above state, the polarity of the phase judging system output signal 1 is 1 and the polarity of the phase judging system output signal 1 is 1 (this state of outputted phase judgment is referred to as a "state 11"). As is apparent from the above descriptions, the signal to be transferred to the filter 35 and its succeeding units differ depending on each of the states. That is, in the state 01, the signals are in phase with each other. In the state 10, signals are in opposite phase. In the state 00, signals are in quadrature phase and opposite phase with each other. In the state 11, signals are in quadrature phase and in phase with each other.

In each of the above states, the relation between an input signal and an output signal from output signal of the mixer 34 is explained by using mathematical expressions. Moreover, amplitudes of these signals are all set to be 1 to simplify the calculation. Under these conditions, when the state is 01, the frequency divider 1 output signal 1 and the frequency divider 2 output signal 1 are in phase with each other and, therefore, an output signal from the mixer 34 is expressed as follows:

$$MIXOUT01 = \cos(2\pi f_1 t) \times \cos(2\pi f_0 t + \phi) \qquad (1)$$
$$= \frac{1}{2}\cos\{2\pi(f_0 - f_1)t + \phi\} + \frac{1}{2}\cos\{2\pi(f_0 + f_1)t + \phi\}$$

where the $\cos(2\pi f_0 t+\phi)$ denotes a signal to be inputted from the low noise amplifier 33, the $\cos(2\pi f_1 t)$ denotes the frequency divider 1 output signal 1, and the $-\sin(2\pi f_1 t)$ denotes the frequency divider 1 output signal 2.

The signal to be inputted to the variable gain amplifier 36 and its succeeding components after the component $(f_0+f_1)$ is removed by the filter 35 is as follows.

$$V01 = \tfrac{1}{2} \cos\{2\pi(f_0-f_1)t+\phi\} \qquad (2)$$

Similarly, when the state is 10, 00, and 11, the following equations respectively hold:

$$V10 = -\tfrac{1}{2} \cos\{2\pi(f_0-f_1)t+\phi\} \qquad (3)$$

$$V00 = \tfrac{1}{2} \sin\{2\pi(f_0-f_1)t+\phi\} \qquad (4)$$

$$V11 = -\tfrac{1}{2} \sin\{2\pi(f_0-f_1)t+\phi\} \qquad (5)$$

As is apparent from the expressions (2), (3), (4), and (5), when the state is 01, the signals to be outputted from the mixer 34 are in opposite phase with the signals to be outputted from the mixer 34 when the state is 10. Also, the signal to be outputted from the mixer when the state is 00 and the signal to be outputted from the mixer 34 when the state is 11 are in opposite phase with each other. This shows that, by inverting a signal based on an output from the phase judging unit 22 in any position between an outputted point from the antenna 31 and the digital signal processing unit 38, the signals appearing when the phase state is 01 and when the phase state is 10 and the signals appearing when the phase state is 00 and when the phase state is 11 can be treated as the same signals.

Thus, according to the present embodiment, the problem of the imbalance between in-phase and quadrature components caused by a difference in path and in loss of the local oscillation signal can be solved. Moreover, a demodulated signal produced in the two phase states appearing when the means to be used for solving the imbalance problem can be received successfully. Further, unlike the case of the Patent Reference 2, it is made possible to omit the mounting of the phase on/off switch 1374, −90° phase shifter 1372, low pass filter 1362, filter on/off switch 1308, and IQ output pass on/off switch 1312, which can reduce power consumption and can achieve a decrease in circuit area.

Second Exemplary Embodiment

Figure 7:
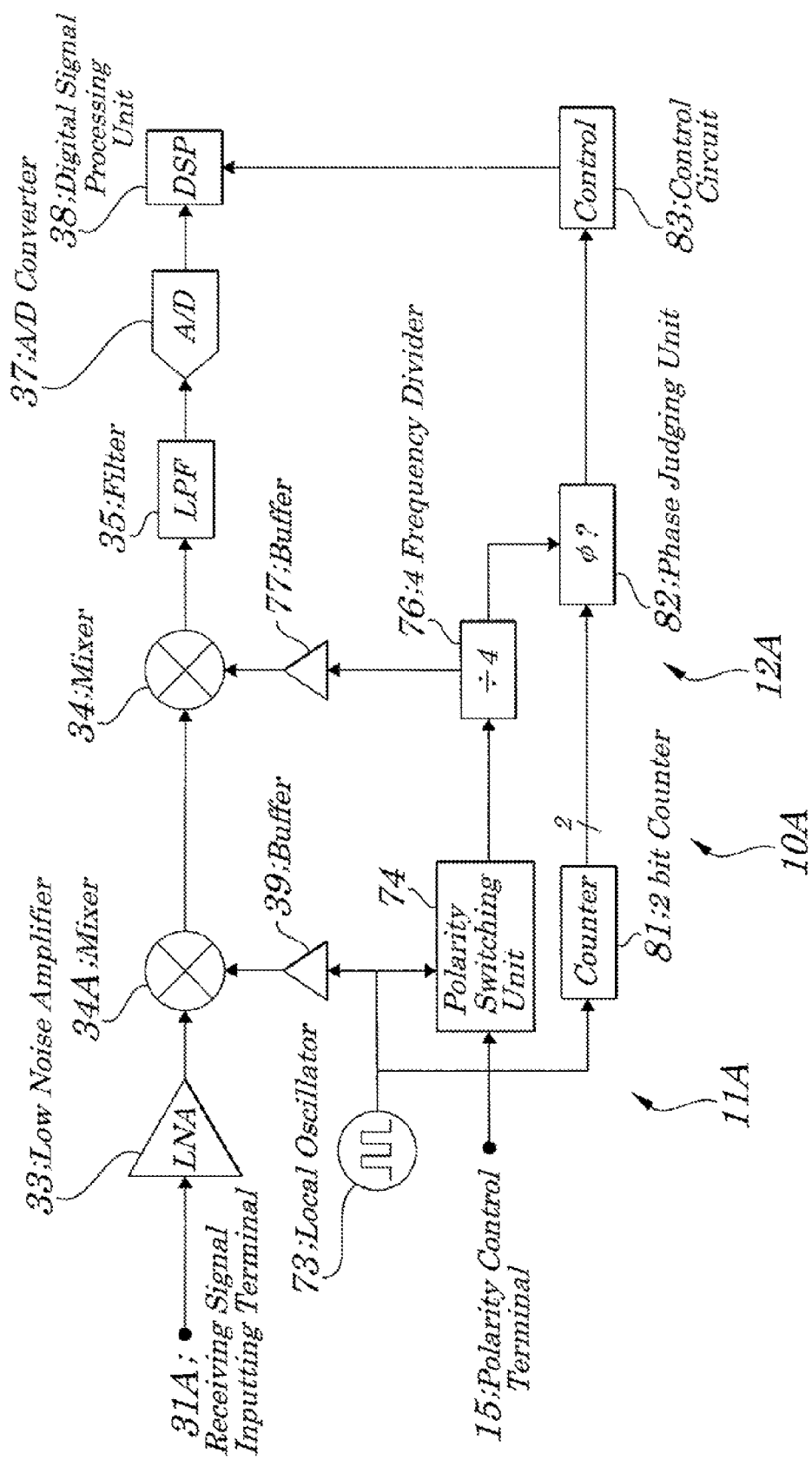
FIG. 7 is a block diagram showing electrical configurations of a signal receiving device according to a second exemplary embodiment of the present invention.
Figure 9:
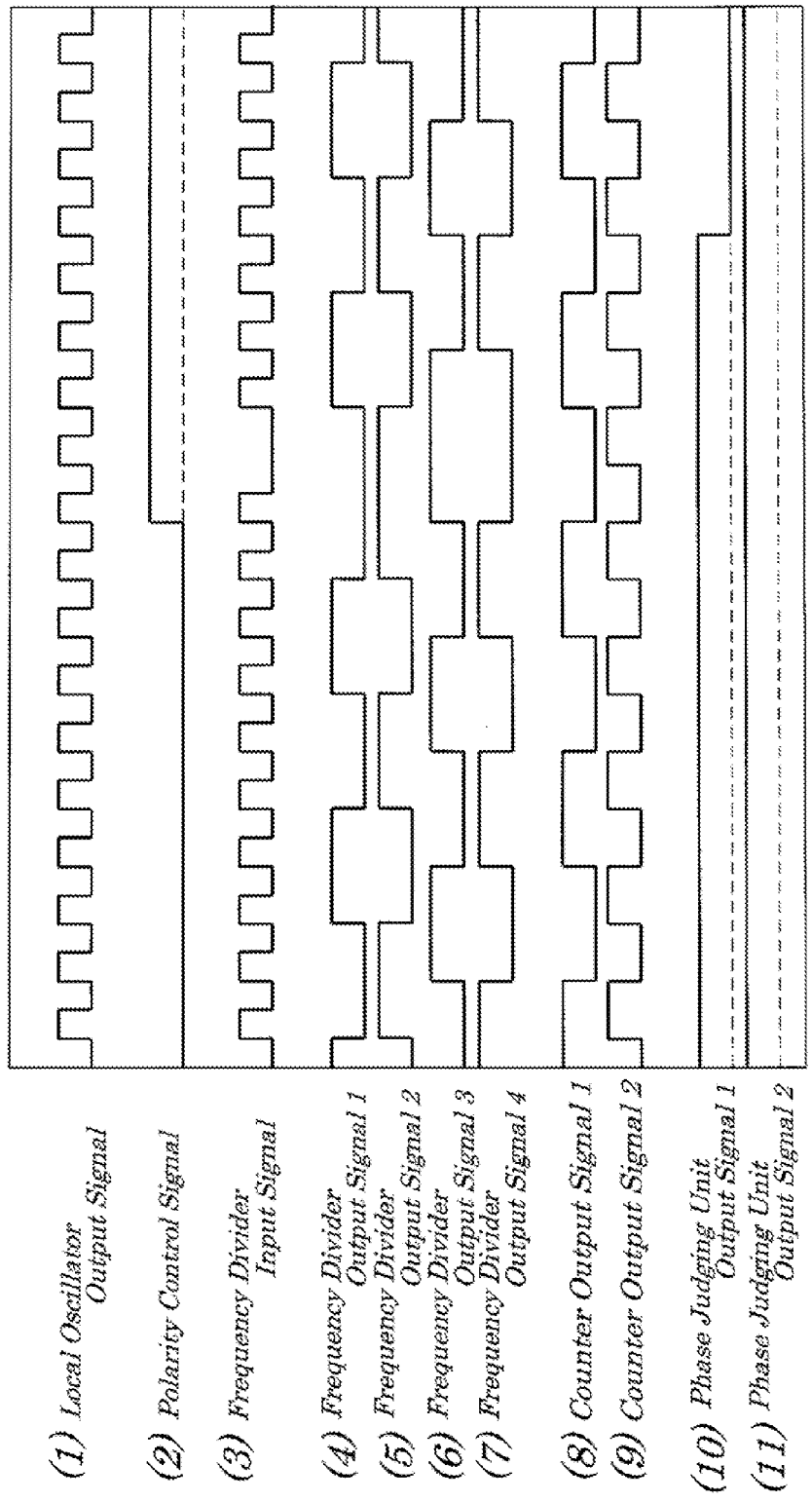
FIG. 9 is a timing chart to explain another example of operations of the signal receiving device according to the second exemplary embodiment of the present invention.
Figure 10:
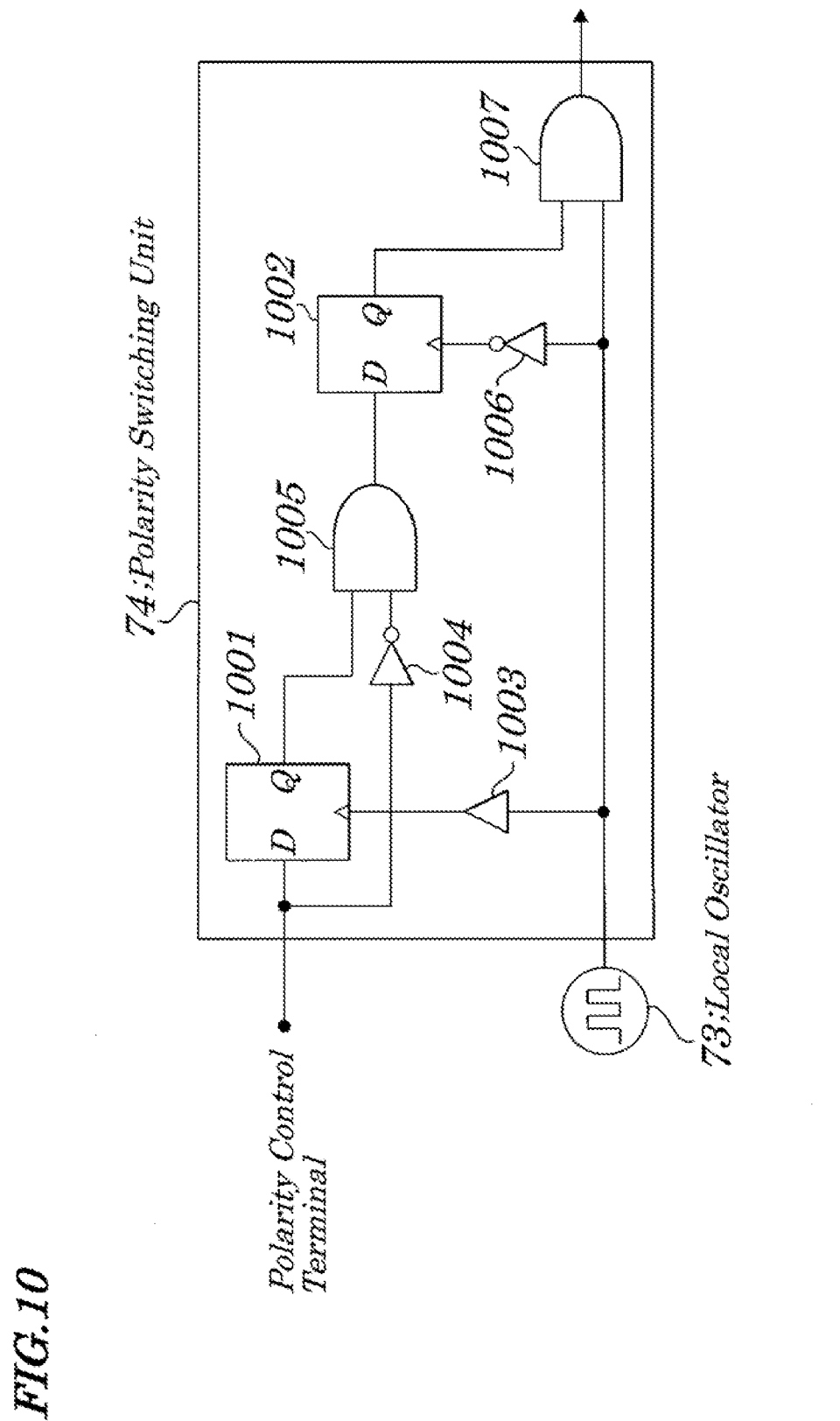
FIG. 10 is a diagram showing one example of a polarity switching unit to be used in the signal receiving device according to the second exemplary embodiment of the present invention.

FIG. 7 is a block diagram showing electrical configurations of a signal receiving device according to a second exemplary embodiment of the present invention. FIG. 8 is a timing chart to explain one example of operations of the signal receiving device of the second exemplary embodiment. FIG. 9 is a timing chart to explain another example of operations of the signal receiving device of the second exemplary embodiment. FIG. 10 is a diagram showing one example of a polarity switching unit to be used in the signal receiving device of the second exemplary embodiment. The configurations of the second exemplary embodiment differ greatly from the first exemplary embodiment in that, in order to supply a local oscillation signal to the mixer, polarity inversion and 4 frequency division of a signal occurring before and after judgment of a state and a frequency divider input signal to be inputted to a frequency divider after the polarity is inverted are used and, in order to judge a phase state, 4 frequency division of a local oscillator signal and a counter output signal to be outputted in response to the local oscillator signal are used.

The signal receiving device 10A of the second exemplary embodiment of the present embodiment, as shown in FIG. 7, includes, as its main components of the present invention, a local oscillation signal supplying system 11A to supply a local oscillation signal to a local oscillation signal input terminal of a differential input mixer 34A (hereinafter, may be simply referred to as mixer 34A) and a phase judging system 12A making up the signal receiving device 10A. The local oscillation signal supplying system 11A includes a local oscillator 73, a polarity switching unit 74, a 4 frequency divider, and a buffer 77. The phase judging system 12A is made up of the polarity switching unit 74, a 2-bit counter 81, a phase judging unit 82, and a control circuit 83.

The local oscillator 73 in the local oscillation signal supplying system 11A is an oscillator to output a local oscillator output signal ((1) in FIGS. 8 and 9) having a frequency being 4 times higher than of the local oscillation signal to be originally supplied. The polarity switching unit 74 is a circuit whose input is connected to its output terminal of the local oscillator 73 and to receive a polarity control signal ((2) in FIGS. 8 and 9) having a specific phase relation with the local oscillator output signal fed from a polarity control terminal 15 through a polarity control input terminal, thereby switching the polarity of the local oscillator output signal based on the polarity control signal. FIG. 10 shows an example of configurations of the polarity switching unit 74. The polarity switching unit 74 shown in FIG. 10 includes flip-flop circuits 1001 and 1002, a buffer 1003, inverters 1004 and 1006, and AND circuits 1005 and 1007.

The 4 frequency divider 76 outputs a first frequency divided signal (hereinafter, referred to as "frequency divider output signal 1") ((4) in FIGS. 8 and 9) and a second frequency divided signal (hereinafter, referred to as "frequency divider output signal 2") ((5) in FIGS. 8 and 9) and additionally a third frequency divided signal (hereinafter, referred to as "frequency divider output signal 3") ((6) in FIGS. 8 and 9), and a fourth frequency divided signal (hereinafter, referred to as "frequency divider output signal 4") ((7) in FIGS. 8 and 9). Each of the frequency divider output signals 1 and 2 and the frequency divider output signal 3 and 4 is obtained by dividing the frequency of the local oscillator output signal from the local oscillator 73 by 4. The frequency divider output signals 1 and 2 are in opposite phase with each other and the frequency divider output signals 3 and 4 are also in opposite phase with each other. The frequency divider output signals 1 and 3 are out of phase by ¼ of their period and the frequency divider output signals 2 and 4 are also out of phase by ¼ of their period. The buffer 77 serves to make operations of the 4 frequency divider 76 difficult to be influenced by operations of the mixer 34.

The 2-bit counter 81 in the phase judging system 12A is a circuit to output the counter output signal 1 and counter output signal 2. The counter output signal 1 is obtained by dividing the frequency of the output signal fed from the local oscillator 73 by 4 and the counter output signal 2 is also obtained by dividing the frequency of the output signal fed from the local oscillator 73 by two. The phase judging unit 82 is a circuit to output a frequency divider input signal, frequency divider output signals 1 and 3 fed from the 4 frequency divider 76, and phase judging unit output signals 1 and 2 in response to counter output signals 1 and 2 fed from the 2 bit counter 81. In the present embodiment, the phase judging unit 82 is made up of sequence circuits. The phase judging unit 82 is so configured to hold the values of the phase judging unit output signals 1 and 2 for a period except the case when both the counter output signals 1 and 2 are "0".

The mixer 34A is a frequency conversion circuit which receives a signal through a receiving signal inputting terminal 31A and a low noise amplifier 33 and a local oscillator output signal through a buffer 39 from the above local oscillator 73 to output an intermediate frequency signal. The above described mixer 34 is a frequency conversion circuit which receives an intermediate frequency signal from the mixer 34A and a local oscillation signal from the above local oscillation signal supplying system 11A to output a baseband signal. The output from the mixer 34 is connected to a filter 35 and the output from the filter 35 is connected to an A/D converter 37 and further the output from the A/D converter 37 is connected to a digital signal processing unit 38.

Next, operations of the signal receiving device of the second exemplary embodiment are described by referring to FIGS. 7 to 10. In this embodiment, the local oscillation signal is supplied to the mixer 34 from the local oscillation signal supplying system 11A in almost the same way as in the first exemplary embodiment. That is, the local oscillator output signal ((1) in FIGS. 8 and 9) to be outputted from the local oscillator 73 in the local oscillation signal supplying system 11A, the polarity of which is controlled by the polarity control signal ((2) in FIGS. 8 and 9), is inputted to the 4 frequency divider 76. The 4 frequency divider 76 divides the frequency of the frequency divider input signal ((3) in FIGS. 8 and 9) by 4 and inputs the resulting frequency divider output signal 1 and frequency divider output signal 2 to the mixer 34. The 4 frequency divider 76 supplies the frequency divider output signals 1 and 3 obtained by dividing the frequency of the frequency divider input signal by 4 to the phase judging unit 82. Moreover, the frequency conversion of the receiving signal by the mixer 34 is performed by the same method as in the first exemplary embodiment.

By supplying the local oscillation signal to the mixer as above, the problem occurring in the supply of the local oscillation signal to the mixer 34, that is, the problem of the imbalance between in-phase components and quadrature components caused by a difference in path and in loss of the local oscillation signal can be solved.

The frequency divided signal, as shown in signals (4), (5), (6), and (7) in FIGS. 8 and 9, is outputted from the 4 frequency divider 76 in a state where, when the polarity is set at 0 degrees by the polarity switching unit 74, the transition occurs to phase state of either 0 degrees or 180 degrees or in a state or where, when the polarity is set at 180 degrees by the polarity switching unit 14, the transition occurs to phase state of either 90 degrees or −90 degrees. The two states "01" (quadrature and in phase) and "10" (quadrature and opposite phase) occurring when the polarity is set at 0 degrees are shown on the left side in FIGS. 8 and 9, and the two states "11" (opposite phase) and "00" (in phase) occurring when the polarity is set at 180 degrees are shown on the right side in FIGS. 8 and 9. As described above, in every time of switching of a polarity, the local oscillation signal to be supplied to the mixer 34 takes two phase states and, as in the case of the first exemplary embodiment, the baseband signals to be outputted from the mixer 34 are outputted in opposite phase to each other, also in the present embodiment, the means to solve this problem is provided as below.

Thai is, the phase judging system 12A described above serves as the means to solve the above problem. The phase judging unit 82 in the phase judging system 12A, as shown in FIGS. 8 and 9, outputs the frequency divider output signal 3 as the phase judging unit output signal 1 when the polarity is set at 0 degrees and both the levels of the counter output signals 1 and 2 are 0, and outputs the value of the frequency divider output signal 1 occurring immediately before the rise in response to a succeeding rise of the frequency divider input signal as the phase judging unit output signal 2 when the polarity is set at 180 degrees and both the levels of the counter output signals 1 and 2 are 0.

From these two values of the phase judging unit output signals, the above-described two states can be judged. That is, by inverting signals based on an output from the phase judging unit 82 in any position between an outputted point from the receiving signal inputting terminal 31A and the digital signal processing unit 38, the signals appearing when the state is 01 and the state is 10 and signals appearing when the state is 11 and the state is 00 can be treated as the same signals.

Thus, in the configurations of the present embodiment, the problem of the imbalance between in-phase and quadrature components caused by a difference in path and in loss of the local oscillation signal can be solved and, by the means to be used for solving the imbalance problem, a demodulated signal occurring during the 2 phase states can be successfully received. Further, unlike the case of the Patent Reference 1, it is made possible to omit the mounting of the mixer 1262, buffer 1223, filter 1272, A/D converter 1282, which can reduce power consumption and can achieve a decrease in circuit area size.

Third Exemplary Embodiment

Figure 11:
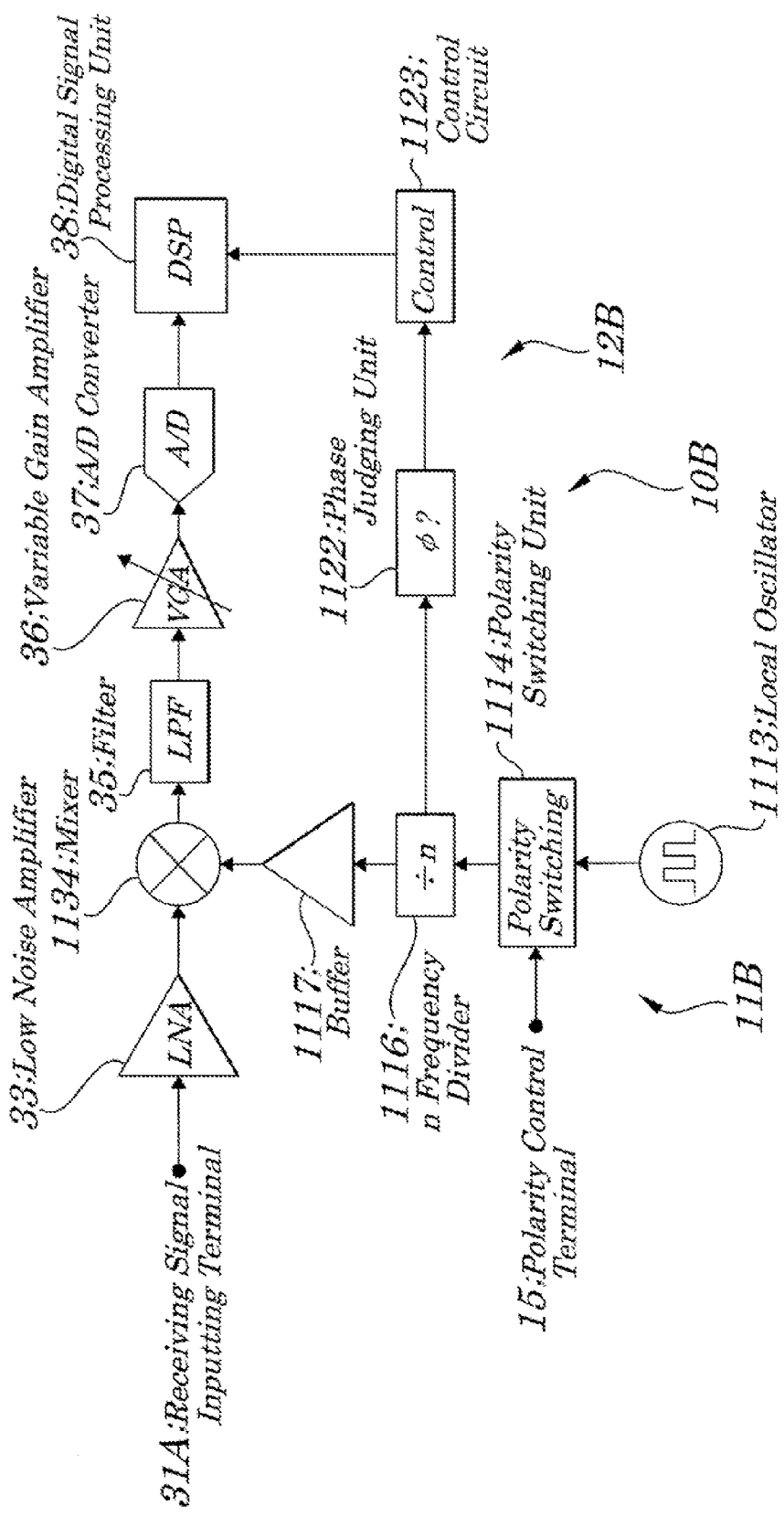
FIG. 11 is a block diagram showing electrical configurations of a signal receiving device according to a third exemplary embodiment of the present invention.
Figure 12:
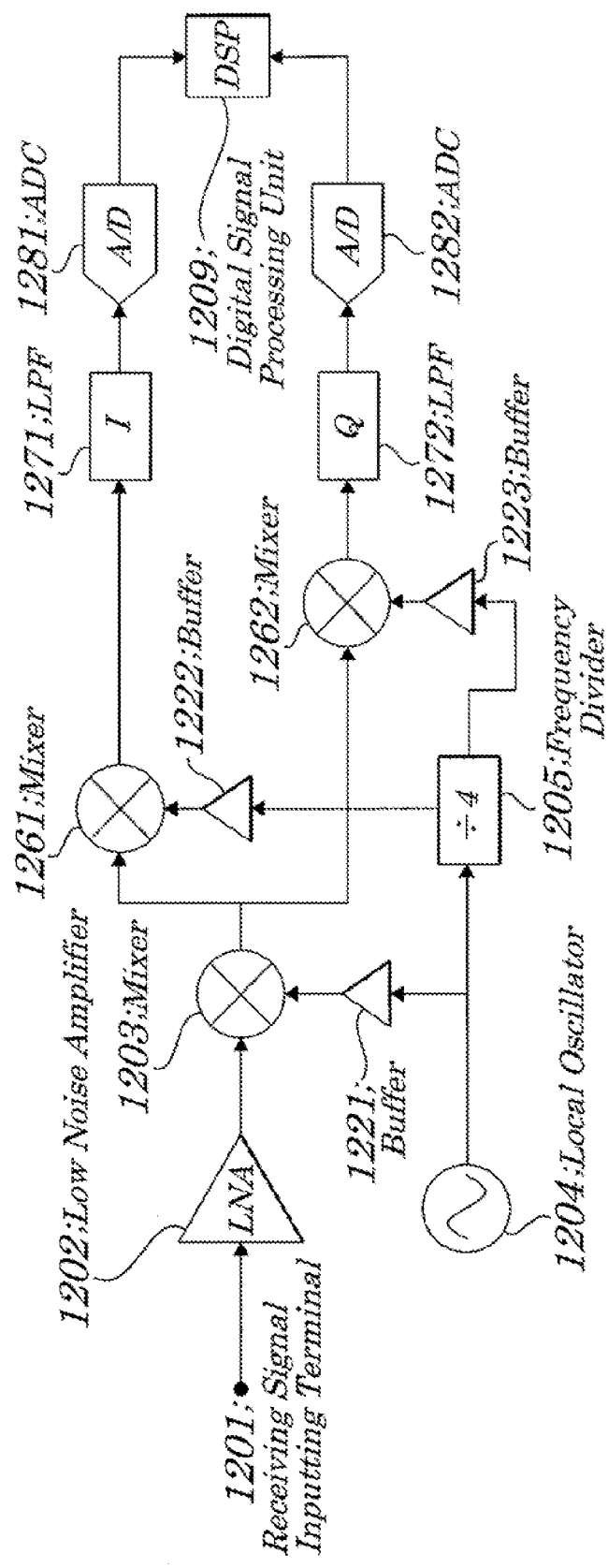
FIG. 12 is a diagram showing a configuration made up of the RF front end having a multistage gradual declining filtering architecture disclosed in the related art Patent Reference 1.
Figure 13:
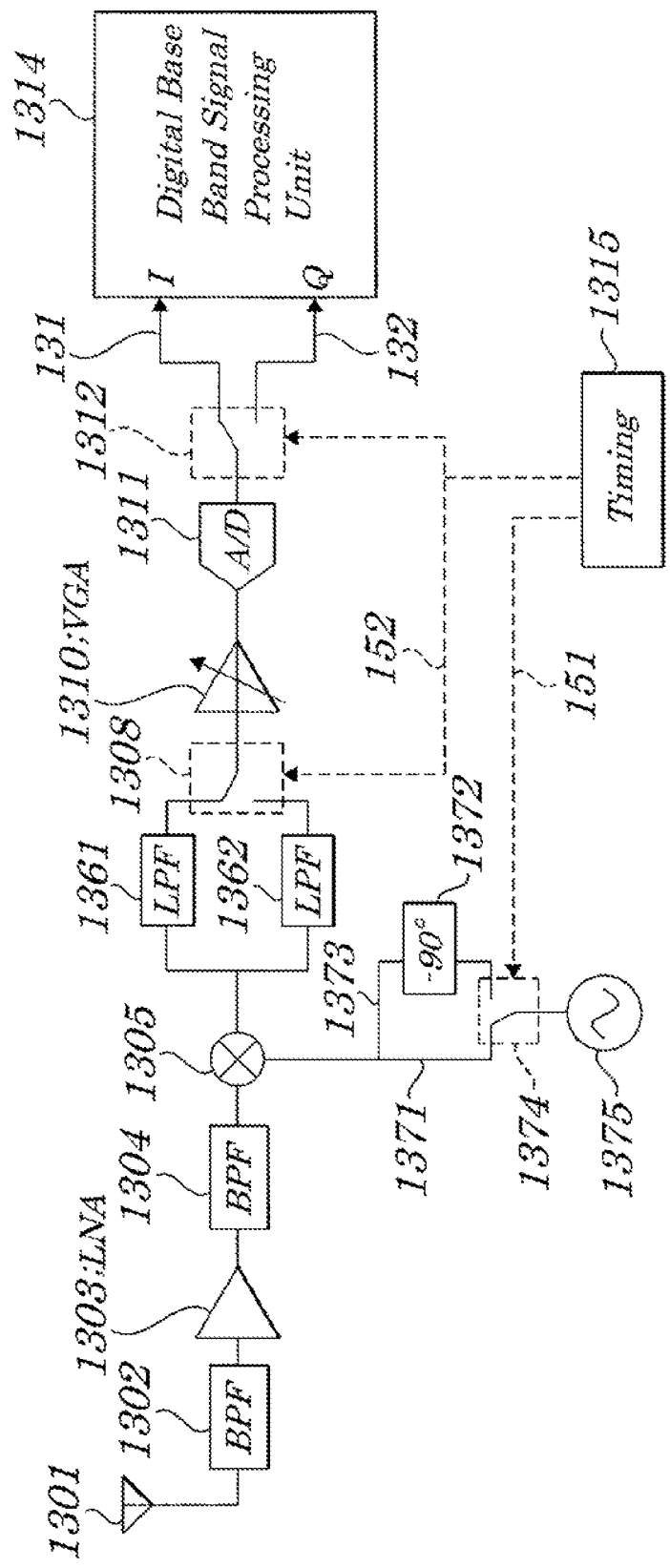
FIG. 13 is a diagram showing an example of the direct conversion-type signal receiving device for explanation of the second related art.

FIG. 11 is a block diagram showing electrical configurations of a signal receiving device according to a third exemplary embodiment of the present invention. The configurations of the third exemplary embodiment differ greatly from those of the first exemplary embodiment in that the local oscillation signal is expanded to be a signal for demodulation of signals other than a quadrature modulated signal. The signal receiving device 10B of the present embodiment, as shown in FIG. 11, includes, as its main components of the present invention, a local oscillation signal supplying system 11B to supply a local oscillation signal to a local oscillation signal input terminal of a differential input mixer 1134 (hereinafter, may be simply referred to as mixer 1134) and a phase judging system 12B making up the signal receiving device 10B.

The local oscillation signal supplying system 11B is made up of a local oscillator 1113, a polarity switching unit 1114, an n-frequency divider 1116, and a buffer 1117. In FIG. 11, the phase judging system 12B includes a phase judging unit 1122 and a control circuit 1123. Additionally, in the case of a modified configuration, a supplying system for a polarity control signal and a frequency divider 1121 (not shown) to output a reference signal for phase comparison are provided.

The local oscillator 1113 in the local oscillation signal supplying system 11B outputs a local oscillator output signal having a frequency being specific times (for example, "n" times) higher than the frequency of a local oscillation signal to be supplied to the mixer 1134. The polarity switching unit 1114, the input of which is connected to an output of the local oscillator 1113, receives a polarity control signal having a specified phase relation with a local oscillator output signal from a polarity control terminal 15 through a polarity switching control input port and switches the polarity of the local oscillator output signal based on the polarity control signal.

The n-frequency divider 1116 is a circuit to divide the frequency of the signal fed from the polarity switching unit 1114 and to output a local oscillation signal having a frequency required by the mixer 1134. The example in which the above local oscillation signal is a 3-phase signal, which can be obtained by using a 3 frequency divider (hereinafter, may be referred to as 3 frequency divider 1116), is described. The local oscillation signal, as in the case of the first exemplary embodiment, is made up of a first frequency divided signal (hereinafter, referred to as frequency divider 1 output signal 1), a second frequency divided signal (hereinafter, referred to as frequency divider 1 output signal 2), and a third frequency divided signal (hereinafter, referred to as frequency divider 1 output signal 3). Moreover, the 3 frequency divider 1116 is a circuit to output, further, a fourth frequency divided signal (hereafter, a frequency divider 1 output signal 4), a fifth frequency divided signal (hereinafter, referred to as frequency divider 1 output signal 5) and a sixth frequency divided signal (hereinafter, referred to as frequency divider 1 output signal 6).

The above frequency divider 1 output signals 1, 2, 4, 5, and 6 are used for phase judgment described later. Each of the frequency divider 1 output signals 1, 2, and 3 and each of the frequency divider 1 output signals 4, 5, and 6 are obtained by dividing the frequency of the local oscillation output signal from the local oscillator 1113. The frequency divider 1 output signals 1, 2, and 3 have a phase difference of 120 degrees among these signals and the frequency divider 1 output signals 4, 5, and 6 also have a phase difference of 120 degrees among these signals. The frequency divider 1 output signals 1 and 4 are out of phase by ⅙ of their period. The frequency divider 1 output signals 2 and 5 are out of phase by ⅙ of their period. The frequency divider 1 output signals 3 and 6 are out of phase by ⅙ of their period. The buffer 1117 is a circuit which makes operations of the 3 frequency divider 1116 difficult to be influenced by operations of the mixer 1134.

The frequency divider 1121 (not shown) provided in the modified example is a circuit to output the frequency divider 2 output signals 1, 2, and 3 obtained by dividing the local oscillator output signal from the local oscillator 1113 by three. The frequency divider 2 output signals 1, 2, and 3 have a phase difference of 120 degrees among these signals. The frequency divider 2 output signal 1 and the frequency divider 1 output signal 1 are in phase with each other. The phase judging unit 1122, as in the case of the first exemplary embodiment, receives the frequency divider 1 output signals 1, 2, 4, 5, and 6 from the 3 frequency divider 1116 to output the phase judging unit output signals 1, 2, and 3 and, in the modified example, receives a polarity control signal and frequency judging unit 2 output signals 1, 2, and 3 from the frequency divider 1121 to output the phase judging unit output signals 1, 2, and 3. When the phase judging unit output signals 1, 2, and 3 are generated, the frequency divider 2 output signal 1 is used as a reference signal for phase judgment.

The mixer 1134 is a frequency conversion circuit which receives a receiving signal through a receiving signal inputting terminal 31A and a low noise amplifier 33 and a local oscillation signal through the above-described local oscillation signal supplying system 11B to output a three-phase baseband signal. The output from the mixer 1134 is connected to a filter 35 whose output is connected to a variable gain amplifier 36 whose output is connected to an A/D converter 37 whose output is connected to the digital signal processing unit 38.

The operations of a signal receiving device 10B according to the third exemplary embodiment are described by referring to FIG. 11. In the present embodiment, the methods of supplying the local oscillation signal to the mixer 1134 from local oscillation signal supplying system 11B are almost the same as in the first exemplary embodiment except that the local oscillation signal is the three-phase signal. That is, the local oscillation output signal to be outputted from the local oscillator 1113 in the local oscillation signal supplying system 11B, after its polarity is controlled by a polarity control signal of the polarity switching unit 1114, is inputted to the 3 frequency divider 1116. The 3 frequency divider 1116 supplies a three-phase signal obtained by dividing the frequency of the frequency divider input signal and the frequency divider 1 output signals 1, 2, and 3 making up the three-phase signal, as the local oscillation signal, to the mixer 1134. The 3 frequency divider 1116 divides the frequency of the frequency divider input signal by three and supplies the frequency divider 1 output signals 4, 5, and 6 obtained by the dividing of the frequency to the phase judging unit 1122.

By supplying the local oscillation signal to the mixer 1134 as described above, also in the present embodiment, the problem occurring in the supply of the local oscillation signal to the mixer 1134, that is, the problem of the imbalance among the three-phase components caused by a difference in path and in loss of the local oscillation signal can be solved.

The frequency divided signal to be outputted from the 3 frequency divider 1116 is outputted in a state where, when the polarity at 0 degrees is set by the polarity switching unit 1114, the transition occurs to any one of phase states of 0 degrees, 120 degrees and 240 degrees, or in a state or where, when the polarity is set at 180 degrees by the polarity switching unit 1114, the transition occurs to any one of phase states of −60 degrees, 60 degrees and −180 degrees. That is, when the polarity is set at 0 degrees, three states occur and, when the polarity is set at 180 degrees, three states occur. As described above, in every time of switching of a polarity, the local oscillation signal to be supplied to the mixer 1134 takes three phase states and, as in the case of the first exemplary embodiment, the baseband signals to be outputted from the mixer 1134 are outputted in opposite phase to each other, also in the present embodiment, the means to solve this problem is provided as below.

The above-described phase judging system 12B serves as the means to solve the above problem. The phase judging unit 1122 of the phase judging system 12B outputs, when the polarity is 0 degrees, by using the frequency 2 output signal 1, the phase judging unit output signals 1, 2, and 3, based on the frequency divider 1 output signals 1, 2, 4, 5, and 6 and also outputs, when the polarity is 180 degrees, by using the frequency 2 output signal 1, the phase judging unit output signals 1, 2, and 3, based on the frequency divider 1 output signals 1, 2, 4, 5, and 6.

From the values of these three phase judging unit output signals, three states described above can be judged. That is, by inverting the signals being in opposite phase to each other based on an output from the phase judging unit 1122 in any position between an outputted point from the receiving signal inputting terminal 31A and the digital signal processing unit 38, the signals being in opposite phase to each other can be treated as the same signals.

Thus, according to the present embodiment, the problem of the imbalance between the three-phase components caused by a difference in path and in loss of the local oscillation signal can be solved. Moreover, a demodulated signal produced in the three-phase states being in opposite phase with one another appearing when the means to be used for solving the imbalance problem can be received successfully. Moreover, unlike in the case of the Patent Reference 2, it is made possible to omit the mounting of the phase on/off switch 1374, −90° phase shifter 1372, low pass filter 1362, filter on/off switch 1308, and IQ output pass on/off switch 1312, which can reduce power consumption and can achieve a decrease in circuit area.

Though various exemplary embodiments have been described in detail with reference to the figures, it is understood that the invention is not limited to these exemplary embodiments but may be changed and modified without departing from the scope and spirit of the invention. For example, in any of the above embodiments, the example in which the frequency divider or counter is used to supply the local oscillation signal to the mixer, however, it is not always necessary that the frequency divider or counter is not used and the present invention is achieved by making a frequency of the local oscillator be the same as that of a receiving signal without the need for using the frequency divider or counter.

Also, in the second exemplary embodiment, the phase comparator may be configured by using the frequency divider output signal 4. Moreover, in the third exemplary embodiment, the example in which the three-phase signals are used is described, however, the present invention is not limited to the three-phase signals and the present invention can be realized by using a signal having other number of phases. Further, when the counter is constructed by using combined circuits, the counter may have the configuration in which, at the moment that the counter output signal becomes zero, the phase judging unit output signal is switched. Therefore, in the phase judging system, a signal to be inputted to the phase judging unit and a signal to be used as a phase judgment reference differ depending on its circuit configuration.

Furthermore, the example of using an absolute reference method by which the reference for phase judgment is derived from the local oscillator is described, however, the present invention can be realized by employing a relative reference in which the reference for phase judgment is derived from phases among the output signals from a frequency divider. Also, the present invention can be configured by using a variable delay unit for changing a signal phase in each of the embodiments. Moreover, when a signal is supplied to a signal using means through a single signal supplying system, the present invention can be realized as an extended one.

INDUSTRIAL APPLICABILITY

The signal receiving device and signal receiving method and the signal supplying unit and signal supplying method of the present invention can be used in various signal processing units or the like.

The invention claimed is:

1. A signal receiving device comprising:
   an inputting unit to which a receiving signal is inputted;
   a signal outputting unit to output a first signal having a frequency being same as or different from a signal of said receiving signal;
   a local oscillation signal outputting unit to output a second signal, in a time-division manner, having a specified phase relationship with said first signal based on said first signal to be outputted from said signal outputting unit; and
   a converting unit to convert a frequency of said receiving signal to be inputted from said inputting unit based on a local oscillation signal to be outputted from said local oscillation signal outputting unit.

2. The signal receiving device according to claim 1, wherein said local oscillation signal outputting unit comprises a polarity switching unit to switch, in a time division way, a polarity of said first signal to be outputted from said signal outputting unit, a frequency divider to be connected to an output terminal of said polarity switching unit, and any one of a counter and a variable delay unit.

3. The signal receiving device according to claim 2, wherein said local oscillation signal outputting unit further comprises a polarity control signal inputting unit wherein said polarity is switched based on a polarity control signal to be inputted from said polarity control signal inputting unit.

4. The signal receiving device according to claim 1, further comprising:
   a digital signal processing unit to digitize a signal outputted from said converting unit;
   a phase judging unit to judge a phase of said signal based on a signal to be outputted from said local oscillation signal outputting unit;
   wherein signal processing in any position between receiving of said receiving signal and processing of said digital signal processing unit is performed based on a judgment result from said digital signal processing unit.

5. The signal receiving device according to claim 1, further comprising:
   a digital signal processing unit to digitize a signal to be outputted from the converting unit; and
   a phase judging unit to judge a phase of said signal based on said polarity control signal to be inputted from said polarity control signal inputting unit and a signal to be outputted from said frequency divider, and a signal to be outputted from any one of said counter and said variable delay unit;
   wherein signal processing in any position between receiving of said receiving signal and processing of said digital signal processing unit is performed based on a judgment result from said digital signal processing unit.

6. A signal receiving device comprising:
   an inputting unit to which a receiving signal is inputted;
   a signal outputting unit to output a first signal having a frequency being same as or different from a signal of said receiving signal;
   a local oscillation signal outputting unit to output, based on said first signal to be outputted from said signal outputting unit, said first signal, a second signal being in opposite phase with said first signal, a third signal having a specified phase relationship with said first signal, and a fourth signal being in opposite phase with said first signal, in a time division way; and
   a converting unit to convert a frequency of said receiving signal to be inputted from said inputting unit based on a local oscillation signal to be outputted from said local oscillation signal outputting unit.

7. The signal receiving device according to claim 6, wherein said local oscillation signal outputting unit comprises a polarity switching unit to switch, in a time division way, a polarity of said first signal to be outputted from said signal outputting unit, a frequency divider to be connected to an output terminal of said polarity switching unit, and any one of a counter and a variable delay unit.

8. The signal receiving device according to claim 7, wherein said local oscillation signal outputting unit further comprises a polarity control signal inputting unit wherein said polarity is switched based on a polarity control signal to be inputted from said polarity control signal inputting unit.

9. The signal receiving device according to claim 6, further comprising:
   a digital signal processing unit to digitize a signal outputted from said converting unit;
   a phase judging unit to judge a phase of said signal based on a signal to be outputted from said local oscillation signal outputting unit;
   wherein signal processing in any position between receiving of said receiving signal and processing of said digital signal processing unit is performed based on a judgment result from said digital signal processing unit.

10. The signal receiving device according to claim 6, further comprising:
    a digital signal processing unit to digitize a signal to be outputted from the converting unit; and
    a phase judging unit to judge a phase of said signal based on said polarity control signal to be inputted from said polarity control signal inputting unit and a signal to be outputted from said frequency divider, and a signal to be outputted from any one of said counter and said variable delay unit;
    wherein signal processing in any position between receiving of said receiving signal and processing of said digital signal processing unit is performed based on a judgment result from said digital signal processing unit.

11. A signal receiving method for performing frequency conversion of a receiving signal having a predetermined frequency to be received by a signal receiving device comprising:
    a step of outputting a first signal having a frequency being same or different from a frequency of said receiving signal from a signal outputting unit;
    a step of outputting, in a time division way, said first signal to be outputted from said signal outputting unit, a second signal having a specified phase relationship with said first signal to be outputted from said signal outputting unit; and
    a step of performing said frequency conversion of a said receiving signal based on said signal to be outputted in a time division way.

12. The signal receiving method according to claim 11, wherein said signal to be outputted in a time division way is generated by switching a polarity of said first signal in a time division way and by supplying the switched signal to a frequency divider and to any one of a counter and a variable delay unit.

13. The signal receiving method according to claim 12, wherein the polarity switching is done by a polarity control signal to be inputted.

14. The signal receiving method according to claim 11, wherein a phase of said signal is judged based on said signal to be outputted in a time division way and signal processing in any position between receiving of said signal and processing by said digital signal processing unit is performed based on a judgment result.

15. The signal receiving method according to claim 11, wherein a phase of said signal is judged based on said polarity control signal and said signal to be outputted in a time division way and signal processing in any position between receiving of said signal and processing by said digital signal processing unit is performed based on said judgment result.

16. A signal receiving method for performing frequency conversion of a receiving signal having a predetermined frequency to be received by a signal receiving device comprising:
a step of outputting a first signal having a frequency being same or different from a frequency of said receiving signal from a signal outputting unit;
a step of outputting, in a time division way, said first signal to be outputted from said signal outputting unit, a second signal being in opposite phase with said first signal, a third signal having a specified phase relationship with said first signal, and a fourth signal being in opposite phase with said third signal; and
a step of performing said frequency conversion of said receiving signal based on said signal to be outputted in a time division way.

17. The signal receiving method according to claim 16, wherein said signal to be outputted in a time division way is generated by switching a polarity of said first signal in a time division way and by supplying the switched signal to a frequency divider and to any one of a counter and a variable delay unit.

18. The signal receiving method according to claim 17, wherein the polarity switching is done by a polarity control signal to be inputted.

19. The signal receiving method according to claim 16, wherein a phase of said signal is judged based on said signal to be outputted in a time division way and signal processing in any position between receiving of said signal and processing by said digital signal processing unit is performed based on a judgment result.

20. The signal receiving method according to claim 16, wherein a phase of said signal is judged based on said polarity control signal and said signal to be outputted in a time division way and signal processing in any position between receiving of said signal and processing by said digital signal processing unit is performed based on said judgment result.

21. A signal supplying unit comprising:
a first signal outputting unit to output a first signal having a frequency being same as or different from an input signal to be inputted by an inputting unit;
a second signal outputting unit to output, based on said first signal to be outputted from said first signal outputting unit, said first signal and a second signal having a phase being different from a phase of said first signal in a time division way, a third signal having a specified phase relationship with said first signal, and a fourth signal being in opposite phase with said third signal;
a supplying unit to supply said signal to be outputted from said second signal outputting unit to a processing unit to perform electrical processing of said input signal.

22. The signal supplying unit according to claim 21, wherein said second signal outputting unit comprises a polarity switching unit to switch a polarity of said first signal to be outputted from said first signal outputting unit, a frequency divider to be connected to an output from said polarity switching unit, and any one of a counter and a variable delay unit.

23. The signal supplying unit according to claim 22, wherein said second signal outputting unit further comprises a polarity control signal inputting unit wherein said polarity is switched by a polarity control signal to be inputted from said polarity control signal inputting unit.

24. A signal supplying unit comprising:
a first signal outputting unit to output a first signal having a frequency being same as or different from an input signal to be inputted by an inputting unit;
a second signal outputting unit to output, based on said first signal to be outputted from said first signal outputting unit, said first signal, a second signal having a phase being in opposite phase with said first signal, a third signal having a specified phase relationship with said first signal, and a fourth signal being in opposite phase with said third signal, in a time division way;
a supplying unit to supply said signal to be outputted from said second signal outputting unit to a processing unit to perform electrical processing of said input signal.

25. The signal supplying unit according to claim 24, wherein said second signal outputting unit comprises a polarity switching unit to switch a polarity of said first signal to be outputted from said first signal outputting unit, a frequency divider to be connected to an output from said polarity switching unit, and any one of a counter and a variable delay unit.

26. The signal supplying unit according to claim 25, wherein said second signal outputting unit further comprises a polarity control signal inputting unit wherein said polarity is switched by a polarity control signal to be inputted from said polarity control signal inputting unit.

27. A signal supplying method for processing an input signal having a specified frequency to be inputted from an inputting unit comprising:
a step of outputting a first signal having a frequency being same as or different from a frequency of said input signal;
a step of outputting, in a time division way, based on said first signal to be outputted from said signal outputting unit, said first signal and a second signal having a phase being different from a phase of said first signal; and
a step of supplying said signal to be outputted, in a time division way, to a processing unit to perform processing of said input signal.

28. The signal supplying method according to claim 27, wherein said signal to be outputted in a time division way is generated by switching a polarity of said first signal in a time division way and by supplying the switched signal to a frequency divider and to any one of a counter and a variable delay unit.

29. The signal supplying method according to claim 28, wherein the polarity switching is done by a polarity control signal to be inputted by said polarity control signal inputting unit.

30. A signal supplying method for processing an input signal having a specified frequency to be inputted from an inputting unit comprising:

a step of outputting a first signal having a frequency being same as or different from a frequency of said input signal;

a step of outputting said first signal to be outputted from said signal outputting unit, a second signal having a phase being in opposite phase with said first signal, a third signal having a specified phase relationship with said first signal, and a fourth signal being in opposite phase with said third signal, in a time division way; and a step of supplying said signal to be outputted, in a time division way, to a processing unit to perform processing of said input signal.

31. The signal supplying method according to claim 30, wherein said signal to be outputted in a time division way is generated by switching a polarity of said first signal in a time division way and by supplying the switched signal to a frequency divider and to any one of a counter and a variable delay unit.

32. The signal supplying method according to claim 31, wherein the polarity switching is done by a polarity control signal to be inputted by said polarity control signal inputting unit.

* * * * *